Nov. 30, 1926.

R. H. HUMMERT 1,609,253

COT FASTENER FOR HEARSE AMBULANCE BODIES

Filed July 22, 1926

INVENTOR,
Robert H. Hummert,
BY
ATTORNEY.

Patented Nov. 30, 1926.

1,609,253

UNITED STATES PATENT OFFICE.

ROBERT H. HUMMERT, OF DAYTON, OHIO, ASSIGNOR TO THE S. H. THOMSON MANUFACTURING COMPANY, OF DAYTON, OHIO, A CORPORATION OF OHIO.

COT FASTENER FOR HEARSE-AMBULANCE BODIES.

Application filed July 22, 1926. Serial No. 124,262.

This invention relates to new and useful improvements in cot fasteners for hearse-ambulance bodies.

It is the principal object of my invention to provide a simple, adjustable and easily operated means for fastening a wheeled cot in a stationary position in a hearse-ambulance body such as are employed on motor vehicles. When the automobile is used as a hearse, my cot fastening brackets, which are permanently attached to a side of the body, may be easily concealed from view; and when the automobile is used as an ambulance, these brackets, which are of channel construction, will receive clamping members that may be easily accommodated to the legs of the wheeled cot to hold it in an immovable position until the patient is removed from the machine.

My cot fastening means are neat and attractive, they take up but little space and the clamping members may be easily removed from the permanently attached channel members when it is desired to use the automobile as a hearse.

Other important and incidental objects will be brought out in the following specifications and particularly set forth in the subjoined claims.

Figure 1:
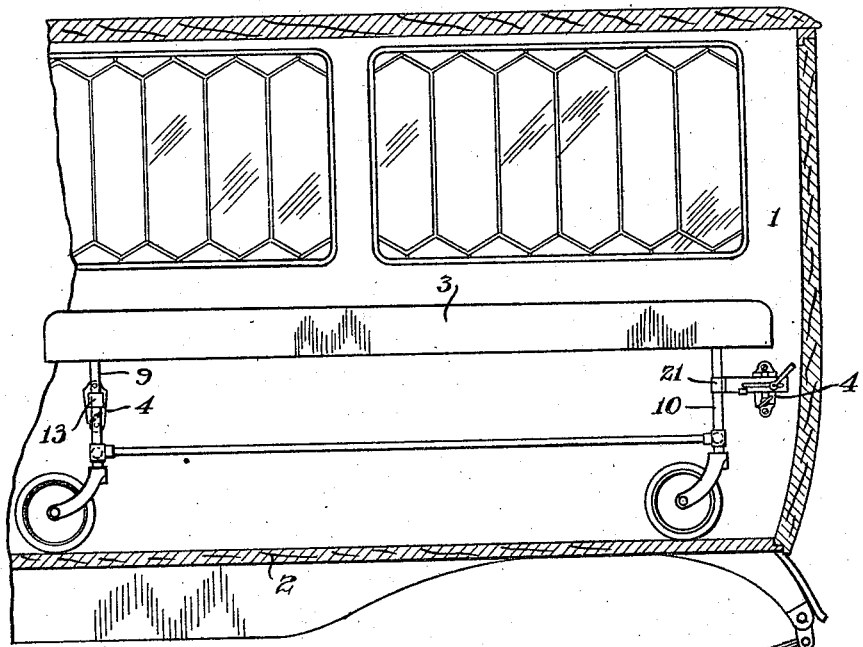
Figure 2:
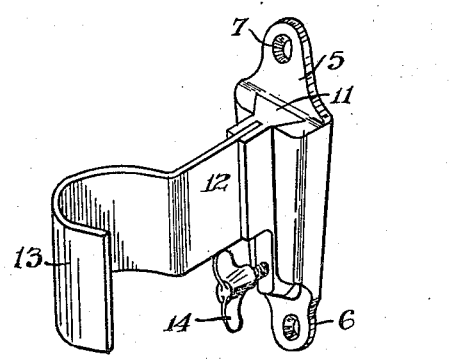
Figure 3:
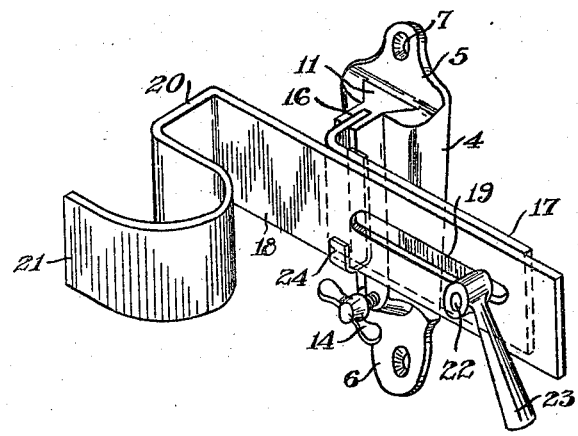

In the accompanying drawings illustrating my invention, Figure 1 is a longitudinal, sectional view taken through an automobile hearse-ambulance body, showing a wheeled cot firmly held therein by my improved fastening means. Figure 2 is a perspective view of one of the cot-leg receiving clamps. Figure 3 is a perspective view of the other clamp, which is adjustable longitudinally to accommodate itself to the cot leg which is behind the leg that is received by the first clamp. And Figure 4 is a front view of one of the channel bracket members that is permanently attached to a side of the hearse-ambulance body.

Referring to the accompanying drawings for a detailed description of my invention, the numeral 1 in Figure 1 designates one side, and 2 the floor, of an automobile hearse-ambulance adapted to receive through the rear a wheeled cot 3. For the purpose of firmly holding this cot in a stationary position when the automobile is used as an ambulance, the following means are provided.

Figure 4:
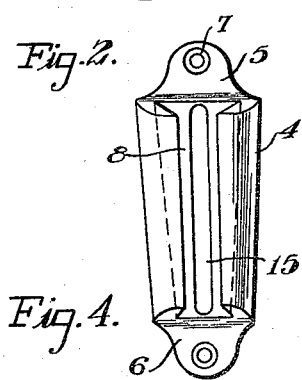

Referring to Figures 1 and 4, there are provided for permanent attachment to the side wall 1 of the hearse-ambulance, channel members 4. As shown in Figure 4, each channel member 4 comprises a metal plate having a thick, rounded, front central portion which tapers inwardly from a flat top ear 5 to a flat bottom ear 6. Each ear contains a hole 7 to receive a screw or other fastening element for the purpose of firmly attaching the plate to the side wall 1 of the hearse-ambulance body shown in Figure 1. The thick central portion of the plate 4 is formed with a dove-tail groove 8 which tapers inwardly throughout its length from top to bottom.

One of the bracket plates 4 is permanently secured to the side wall 1 of the hearse-ambulance body opposite a point where it is desired the middle portion of a front leg 9 of the wheeled cot 3 should come. Another plate 4 is permanently attached to the side wall 1 of the hearse-ambulance at a point behind the first plate 4 where it will be opposite the middle portion of a rear leg 10 of the wheeled cot when the before mentioned front leg of the latter is opposite the front plate. When the automobile is used as a hearse these permanently attached bracket plates 4 may be covered by any suitable means.

For the purpose of holding the wheeled cot 3 in an immovable position within the automobile when the latter is used as an ambulance, there are provided for entrance into the dove-tail grooves 8 of the channel plates 4, 4, the following adjustable clamping members. Slidable from the top into the groove 8 of the front bracket plate 4 is a wedge member 11 having an upper outwardly projecting channel part in which the inner end of a flat clamping piece 12 is fitted and permanently held. The outer end of this clamping piece 12 is bent to hook shape to fit around the before mentioned front leg 9 of the cot 3. (See Figures 1 and 2.) This outer end of the clamping piece 12, which will be designated by the numeral 13, is held in an adjusted position by a thumb screw 14 whose inner threaded end is free to travel in a groove 15 in the plate 4 and to engage the bottom of said groove to hold the wedge member 11 stationary when tightened.

Into the groove 8 in the rear plate 4 another wedge member 11 is inserted, but in its channel projection there is secured the right angled end 16 of a flat, clamp-supporting piece 17. Free to slide longitudinally along this piece 17 is a flat, clamping piece 18 formed with a slot 19 in its rear end and terminating at its front end in a right-angled part 20 from which said piece is bent rearwardly and then forwardly in a curved line to form a hook portion 21 to engage the before mentioned rear leg 10 of the cot from a direction opposite to that in which the front leg 9 is engaged by the hook 13 on the clamping piece 12. (See Figures 1 and 3.)

For the purpose of holding the clamping piece 18 in an adjusted position with respect to the supporting piece 17, there projects through a hole in the latter, into and through the slot 19 in the former, the threaded shank of a screw 22. To the outer end of the latter there is applied a handle nut 23 by means of which the clamping piece 18 is drawn firmly against the supporting piece 17. To assist the screw 22 in supporting the clamping piece 18, there is secured to the supporting piece 17 an angle clip 24 upon which the clamping piece 18 is free to slide. (See Figure 3.) The wedge member 11 of the rear plate 4 also carries a thumb screw 14 for the same purpose for which the similar thumb screw is employed in connection with the front plate 4.

When it is desired to use the body shown in Figure 1 as an ambulance one, the permanently attached plates 4, 4 are uncovered and their respective clamping members inserted in their dove-tail grooves 8. The cot 3 is then wheeled to a position close against the side 1 of the body wherein its inner front leg 9 will engage the hook portion 13 of the front clamping piece 12. The handle nut 13 of the rear clamping unit is then loosened so that the clamping piece 18 may be moved forwardly to engage its hook portion 21 behind the rear inner leg 10 of the cot. The handle nut 23 is then tightened to firmly hold the clamping piece 18 in its adjusted position, whereupon the cot will be solidly held in a stationary position within the car. By tightening the thumb screws 14 the clamping pieces 13 and 18 will be held against vertical movement incident to jars to which the automobile is subjected in traveling an uneven road.

It is thus seen that I have provided simple, compact and easily adjusted fastening means for the wheeled cots of hearse-ambulance bodies.

Having described my invention, I claim:

1. Means for fastening a wheeled cot in a motor vehicle body, comprising a pair of channel members permanently attachable to one side of said body, a clamping device insertable in one channel member to engage one inner leg of the cot, and a longitudinally adjustable clamping device insertable in the other channel member to engage the other inner leg of the cot for the purpose specified.

2. Means for fastening a wheeled cot in a motor vehicle body, comprising a pair of channel members permanently attachable to one side of said body, an element insertable in one channel member, a clamping piece having a hook end portion secured to said insertable element for engagement with one inner leg of said cot, an element insertable in the other channel member, a horizontal supporting piece carried by said insertable element, and a clamping piece having a hook end portion, adjustable along said supporting piece for engagement with the other inner leg of said cot for the purpose specified.

3. Means for fastening a wheeled cot in a motor vehicle body, comprising a pair of channel members permanently attachable to one side of said body, a clamping piece insertable in one channel member to engage one inner leg of the cot, an element insertable in the other channel member, a flat horizontal supporting piece carried by said insertable element, a flat clamping piece formed with a slot in one end and formed with a hook portion on its other end, a screw projecting from the supporting piece through said slot, and a nut adapted to be applied to the outer end of said screw to hold the clamping piece in an adjusted position relative to the other inner leg of said cot, for the purpose specified.

4. Means for fastening a wheeled cot in a motor vehicle body, comprising a pair of bracket members permanently attachable to one side of said body, each bracket member formed with a dove-tail groove tapering inwardly from top to bottom, a wedge element insertable from the top in each groove, a clamping device carried by one wedge element for engagement with one inner leg of the cot, and an adjustable clamping device carried by the other wedge element for engagement with the other inner leg of said cot for the purpose specified.

5. Means for fastening a wheeled cot in a motor vehicle body, comprising a pair of bracket members permanently attachable to one side of said body, each bracket formed with a dove-tail groove tapering inwardly from top to bottom, a wedge element insertable from the top in each groove, a clamping device carried by one wedge element for engagement with one inner leg of the cot, a laterally adjustable clamping device carried by the other wedge element for engagement with the other leg of said cot, and a set screw carried by each wedge element to hold it in an adjusted vertical position within its respective bracket member.

In witness whereof I have hereunto set my hand this 20th day of July, 1926.

ROBERT H. HUMMERT.